(12) United States Patent
Li et al.

(10) Patent No.: US 10,418,870 B2
(45) Date of Patent: Sep. 17, 2019

(54) SYNCHRONOUS RELUCTANCE MOTOR WITH MAGNETIC LEAKAGE PATH SATURATED BY PERMANENT MAGNETS

(71) Applicant: GM GLOBAL TECHNOLOGY OPERATIONS LLC, Detroit, MI (US)

(72) Inventors: Jingchuan Li, Troy, MI (US); Khwaja M. Rahman, Troy, MI (US); Robert T. Dawsey, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 167 days.

(21) Appl. No.: 15/364,305

(22) Filed: Nov. 30, 2016

(65) Prior Publication Data

US 2018/0152066 A1    May 31, 2018

(51) Int. Cl.
*H02K 1/27*    (2006.01)

(52) U.S. Cl.
CPC .................. *H02K 1/2766* (2013.01)

(58) Field of Classification Search
CPC . H02K 1/27–278; H02K 1/276; H02K 1/2766
See application file for complete search history.

(56) References Cited

U.S. PATENT DOCUMENTS

| 8,664,822 B2* | 3/2014 | Vyas ................. | H02K 1/2766 |
| | | | 310/156.39 |
| 9,800,103 B2* | 10/2017 | Buttner .............. | H02K 15/02 |
| 2013/0119805 A1* | 5/2013 | Higuchi .............. | H02K 1/276 |
| | | | 310/156.01 |
| 2014/0252903 A1* | 9/2014 | Rahman .............. | H02K 1/02 |
| | | | 310/156.53 |
| 2016/0329845 A1* | 11/2016 | Jannot ................ | H02K 1/2766 |

FOREIGN PATENT DOCUMENTS

| CN | 103107618 A | 5/2013 |
| CN | 103457372 A | 12/2013 |
| CN | 105900317 A | 8/2016 |

* cited by examiner

*Primary Examiner* — Nguyen Tran
(74) *Attorney, Agent, or Firm* — Quinn IP Law

(57) ABSTRACT

A synchronous reluctance motor includes a stator and a rotor. The rotor is configured to rotate relative to the stator about a rotational axis. The rotor is spaced apart from the stator to define an air gap between the stator and the rotor and includes a rotor core defines an outermost rotor surface and an innermost rotor surface opposite the innermost rotor surface. The rotor core includes a plurality of ribs separating rotor cavities from each other and includes a plurality of rotor bridges separating the air gap and the rotor cavities. Permanent magnets are each disposed in one of the rotor cavities. The magnet surface area of the permanent magnets is less than cavity surface area of the rotor cavities. Each of the permanent magnets is adjacent to the outermost rotor surface to maximize magnetic saturation at the ribs and the rotor bridges.

20 Claims, 3 Drawing Sheets

SYNCHRONOUS RELUCTANCE MOTOR WITH MAGNETIC LEAKAGE PATH SATURATED BY PERMANENT MAGNETS

INTRODUCTION

The present disclosure relates to synchronous reluctance motors and methods for manufacturing the same.

A synchronous reluctance motor is an electric motor that induces non-permanent magnetic poles on the ferromagnetic rotor. Synchronous reluctance motors have an equal number of stator and rotor poles. In a synchronous reluctance motor, torque is generated through magnetic reluctance.

SUMMARY

The present disclosure relates to synchronous reluctance motors. The synchronous reluctance motor includes a stator including a plurality of electrical conductors and a rotor concentrically disposed in relation to the stator. The rotor is configured to rotate relative to the stator about a rotational axis. Moreover, the rotor is spaced apart from the stator to define an air gap between the stator and the rotor and includes a rotor core. The rotor core defines an outermost rotor surface and an innermost rotor surface opposite the innermost rotor surface. The rotor core includes a plurality of polar pieces arranged annularly about the rotational axis. At least one of the polar pieces defines a plurality of rotor cavities. The rotor core includes a plurality of ribs separating the rotor cavities from each other. The rotor core includes a plurality of rotor bridges separating the air gap and the rotor cavities. The rotor further includes a plurality of permanent magnets each disposed in one of the rotor cavities. Each of the rotor cavities has a cavity surface area defined along a plane. Each of the permanent magnets has a magnet surface area defined along the plane, and the magnet surface area is less than one tenth of the cavity surface area. Each of the permanent magnets is adjacent to the outermost rotor surface to maximize magnetic saturation at the ribs and the rotor bridges. The relatively small permanent magnets are placed near the rotor bridges to saturate the magnetic leakage flux path, thereby increasing the reluctance torque of the synchronous reluctance motor without increasing the spin loss in comparison with conventional motors. To this end, at least one of the permanent magnets is disposed adjacent the rotor bridges. In the depicted embodiment, the entirety of each the permanent magnets is closer to the outermost rotor surface than to the innermost rotor surface in order to maximize reluctance torque and power of the synchronous reluctance motor.

The present disclosure also describes vehicles. In an embodiment, the vehicle includes a driveline and a synchronous reluctance motor operatively connected to the driveline. The synchronous reluctance motor is a synchronous reluctance motor and includes: a stator including a plurality of electrical conductors and a rotor concentrically disposed in relation to the stator. The rotor is configured to rotate relative to the stator about a rotational axis and is spaced apart from the stator to define an air gap between the stator and the rotor. In one or more embodiments, the rotor includes a rotor core defining an outermost rotor surface and an innermost rotor surface opposite the innermost rotor surface. The rotor core includes a plurality of polar pieces arranged annularly about the rotational axis. One or more of the polar pieces defines a plurality of rotor cavities. The rotor core includes a plurality of rotor bridges separating the air gap and the rotor cavities. Further, the rotor core includes a plurality of ribs separating the rotor cavities from each other. Additionally, the rotor includes a plurality of permanent magnets each disposed in one of the rotor cavities. Each of the permanent magnets may be closer to the rotor bridges than to the ribs. Moreover, each of the permanent magnets is adjacent to the outermost rotor surface to maximize magnetic saturation at the rotor bridges. Each of the rotor cavities has a cavity surface area defined along a plane. Each of the permanent magnets has a magnet surface area defined along the plane. Further, each of the permanent magnets has a maximum magnet width and a maximum magnet length. The magnet surface area is equal to the maximum magnet width multiplied by the maximum magnet length. In one or more embodiments, the magnet surface area is less than one tenth of the cavity surface area. In one or more embodiments, the magnet surface area is greater than one fifteenth of the cavity surface area. The magnet surface area may have a rectangular shape. As a non-limiting example, only the permanent magnets are disposed inside the rotor cavities, and the permanent magnets occupy less than fifty percent of an entire volume of the rotor cavities. The rotor cavities are arranged in a plurality of cavity layers spaced apart from each other along a radial direction. The plurality of cavity layers may include a first cavity layer, a second cavity layer, and a third cavity layer. Each of the plurality of rotor cavities may include a first rotor cavity, a second rotor cavity, and a third rotor cavity. Each of the plurality of cavity layers may be defined only by the first rotor cavity, the second rotor cavity, and the third rotor cavity. The first rotor cavity, the second rotor cavity, and the third rotor cavity may collectively define a conic section shape. A first intra-polar rib may separate the separates the first rotor cavity from the second rotor cavity along a tangential direction, which is perpendicular to the radial direction. A second intra-polar rib may separate the second rotor cavity from the third rotor cavity along the tangential direction. As a non-limiting example, each of the cavity layers includes only two permanent magnets. The maximum magnet length of each of the permanent magnets disposed in the first cavity layer may be about 1.73 millimeters. The maximum magnet width of each of the permanent magnets disposed is the first cavity layer may be about 0.86 millimeters. The maximum magnet length of each of the permanent magnets disposed in the first cavity layer may be about 1.08 millimeters. The maximum magnet width of each of the permanent magnets disposed is the second cavity layer may be about 1.2 millimeters. The maximum magnet length of each of the permanent magnets disposed in the third cavity layer may be about 2.43 millimeters. The maximum magnet width of each of the permanent magnets disposed is the second cavity layer may be about 1.35 millimeters.

The above features and advantages, and other features and advantages of the present synchronous reluctance motor are readily apparent from the following detailed description of some of the best modes and other embodiments for carrying out the synchronous reluctance motor, as defined in the appended claims, when taken in connection with the accompanying drawings.

DETAILED DESCRIPTION

Figure 1:
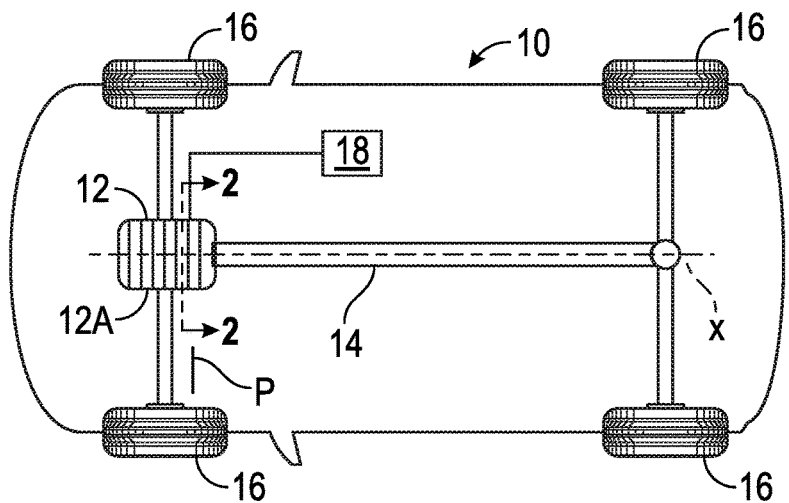
FIG. 1 is a schematic illustration of a vehicle including a synchronous reluctance motor.

Referring to the drawings, wherein like reference numbers refer to like components, FIG. 1 shows a vehicle 10 including a synchronous reluctance motor 12 configured to propel the vehicle 10. The synchronous reluctance motor 12 can be configured to provide torque or force to another component of the vehicle 10, thereby propelling the vehicle 10. Aside from propelling the vehicle 10, the synchronous reluctance motor 12 can be used to power other suitable devices. The synchronous reluctance motor 12 may be a brushless motor and includes six substantially identical interconnected segments 12A disposed side by side along a rotational axis X, which is defined along the length of the synchronous reluctance motor 12. It is contemplated, however, that the synchronous reluctance motor 12 may include more or fewer segments 12A. The number of interconnected segments 12A is directly related to the torque the synchronous reluctance motor 12 is capable of producing for powering the vehicle 10. In one embodiment, the synchronous reluctance motor 12 is a synchronous reluctance motor.

The vehicle 10 includes a driveline 14 having a transmission and a driveshaft (not shown). The driveline 14 is operatively connected between the synchronous reluctance motor 12 and driven wheels 16 via one or more suitable couplers such as constant velocity and universal joints (not shown). The operative connection between synchronous reluctance motor 12 and the driveline 14 allows the synchronous reluctance motor 12 to supply torque to the driven wheels 16 in order to propel the vehicle 10.

In addition to the driveline 14, the vehicle 10 includes an energy-storage device 18 configured to supply electrical energy to the synchronous reluctance motor 12 and other vehicle systems (not shown). To do so, the energy-storage device 18 is electrically connected to the synchronous reluctance motor 12. Due to this electrical connection, the synchronous reluctance motor 12 is configured to receive electrical energy from the energy-storage device 18 and can operate as a generator when driven by a motive energy source of the vehicle 10 that is external to the synchronous reluctance motor 12. Such external motive energy may be, for example, provided by an internal combustion engine (not shown) or by the driven wheels 16 via vehicle inertia.

Figure 2:
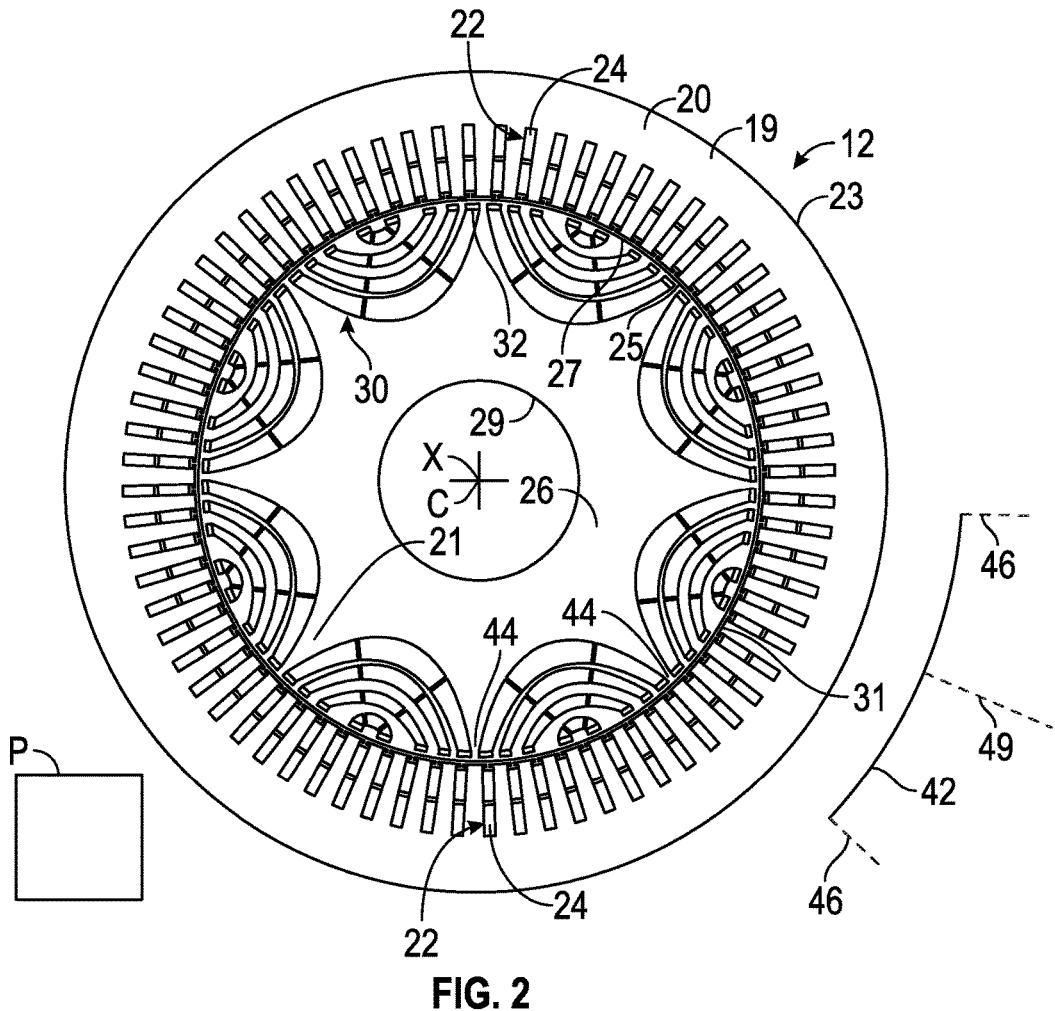
FIG. 2 is a schematic front cross-sectional view of the synchronous reluctance motor schematically shown in FIG. 1, taken along section line 2-2.

FIG. 2 shows a cross-sectional view of a portion of synchronous reluctance motor 12 taken along a virtual plane P. The synchronous reluctance motor 12 includes a stator 20 having a stator core 19. The stator core 19 has apertures 22, and the stator 20 includes electrical conductors 24 disposed in the apertures 22. The electrical conductors 24 are electrically connected to the energy-storage device 18 (FIG. 1). This electrical connection allows the energy-storage device 18 (FIG. 1) to supply electrical energy to the electrical conductors 24. The stator 20 may have a substantially annular shape and may be disposed around the rotational axis X. Furthermore, the stator 20 may define an outermost stator surface 23 and an innermost stator surface 25 opposite the outermost stator surface 23. Both the outer stator surface 23 and the inner stator surface 25 may define a circumference around the rotational axis X. The apertures 22 may be disposed closer to the inner stator surface 25 than the outer stator surface 23, and each is shaped and sized to receive one or more electrical conductors 24. As used herein, the term "apertures" includes without limitation slits, slots, openings, or any cavity in the stator 20 configured and shaped to receive at least one electrical conductor 24. The electrical conductors 24 may be made of a suitable electrically conductive material such as metallic materials like copper and aluminum. The electrical conductors 24 can be configured as bars or windings and may have any suitable shape such as substantially rectangular, cuboid, and cylindrical shapes. Irrespective of its shape, each electrical conductor 24 is shaped and sized to be received in one aperture 22. Although the drawings show the apertures 22 containing two electrical conductors 24, each aperture 22 may contain more or fewer electrical conductors 24.

The synchronous reluctance motor 12 further includes a rotor 26 disposed around the rotational axis X and within the stator 20. The stator 20 may be disposed concentrically with the rotor 26. The rotor 26 includes a rotor core 21 wholly or partly formed of a metallic material such as stainless steel, may have a substantially annular shape, and defines a plurality of rotor cavities 30 and a plurality of permanent magnets 32 disposed within the rotor cavities 30. It is envisioned that the rotor cavities 30 may be configured as slots. The permanent magnets 32 are tightly fitted in the rotator cavities 30 and include an alloy of a rare earth element such as neodymium, samarium, or any other suitable ferromagnetic material. Suitable ferromagnetic materials include a Neodymium Iron Boron (NdFeB) alloy and a Samarium Cobalt (SmCo) alloy. The permanent magnets 32 may be annularly around the rotational axis X and are configured to magnetically interact with the electrical conductors 24. During operation of the synchronous reluctance motor 12, the rotor 26 revolves relative to the stator 20 around the rotational axis X in response to the magnetic flux developed between the electrical conductors 24 and the permanent magnets 32, thereby generating drive torque to power the vehicle 10.

In the depicted embodiment, the rotor 26 defines an outermost rotor surface 27 and an innermost rotor surface 29 opposite the outermost rotor surface 27. Both the outermost rotor surface 27 and the innermost rotor end 29 may define a circumference around the rotational axis X. The synchronous reluctance motor 12 may define an air gap 31 between the innermost stator surface 25 and the outermost rotor surface 27. The air gap 31 may have a substantially annular shape and spans around the rotor 26. The rotor 26 includes a plurality of poles pieces 42 arranged annularly around a rotor center C, which may coincide with the rotational axis X. Though the drawings show eight polar pieces 42, the rotor 26 may include more or fewer polar pieces 42. Inter-polar bridges 44 separate consecutive polar pieces 42 and can be elongated along respective inter-polar axes 46. Each inter-polar axis 46 extends through the rotator center C and substantially through the middle of a respective inter-polar bridge 44 and defines the demarcation between two consecutive polar pieces 42. Consecutive polar pieces 42 have opposite polarities. Each polar piece 42 further defines a center pole axis 49 extending through the rotator center C and substantially through the middle of said polar piece 42. The center pole axis 49 of each polar piece 42 may also intersect the rotational axis X.

Figure 3:
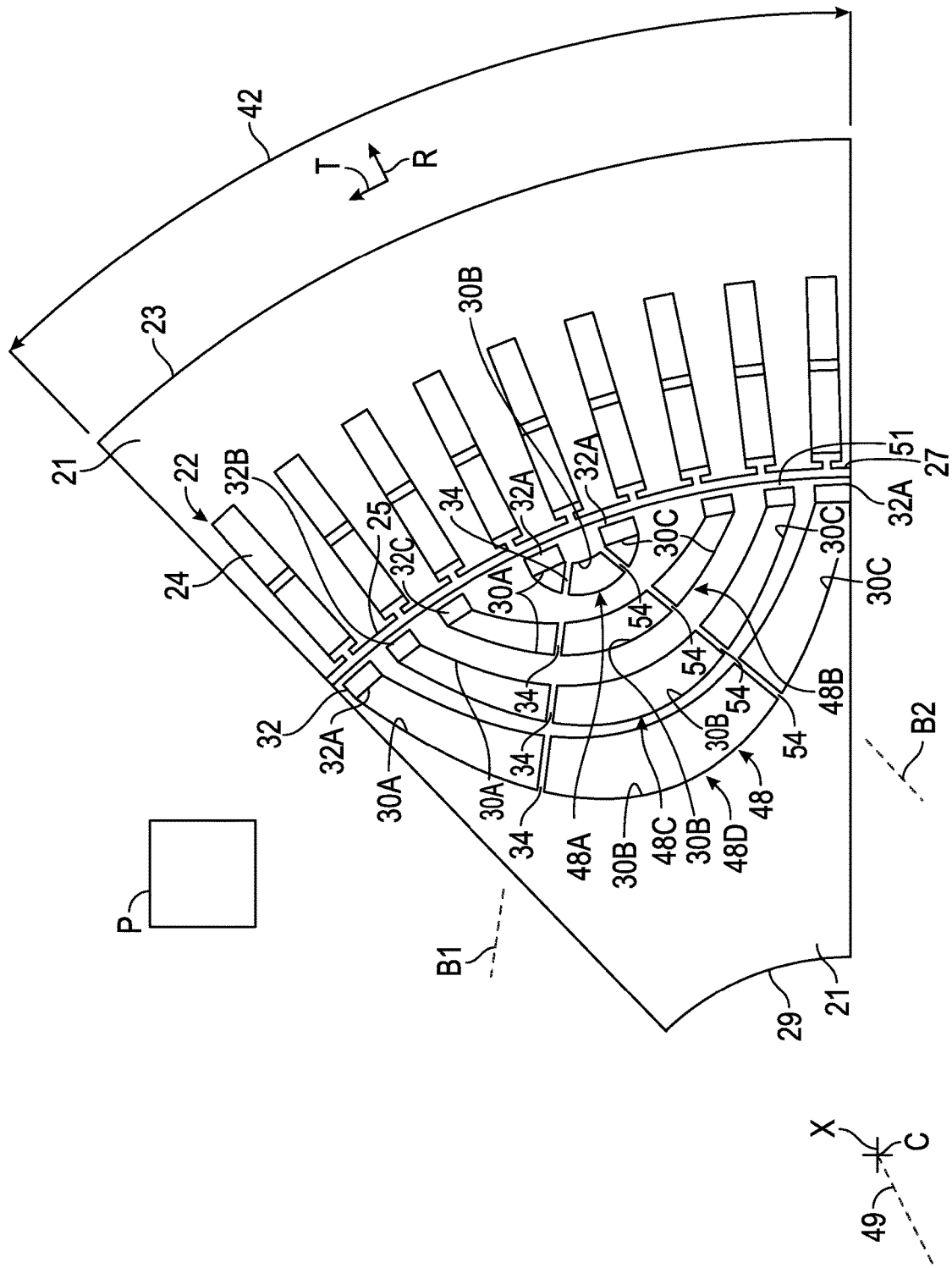
FIG. 3 is a schematic enlarged cross-sectional view of a polar piece of the synchronous reluctance motor shown in FIG. 2.

With reference to FIG. 3, the rotor 26 further includes a plurality of rotor bridges 51 separating the air gap 31 and the rotor cavities 30. Accordingly, the rotor bridges 51 partially define the outermost rotor surface 27 and are entirely disposed between the air gap 31 and the rotor cavities 30. As discussed below, the rotor cavities 30 are completely empty, except for the permanent magnets 32 disposed inside the rotor cavities 30. In other words, only the permanent magnets 32 are disposed inside the rotor cavities 30.

Each polar piece 42 includes a plurality of permanent magnets 32, which are disposed in the rotor cavities 30. The rotor cavities 30 are arranged in cavity layers 48. In the depicted embodiment, each polar piece 42 includes four cavity layers 48A, 48B, 48C, and 48D spaced apart from one another along a radial direction, which is indicated by arrow R. Although the drawings show four cavity layers 48, each polar piece 42 may include more or fewer cavity layers. The rotor cavities 30 in each cavity layer 48 only include a pair of permanent magnets 32 that are spaced apart from each other along a tangential direction, which is indicated by arrow T. In other words, as non-limiting example, each cavity layer 48 includes only two permanent magnets 32 to maximize the reluctance torque of the synchronous reluctance motor 12 without increasing the spin loss. The tangential direction (as indicated by arrow T) may be substantially perpendicular to the radial direction (indicated by arrow R). Each permanent magnet 32 may be a monolithic structure. Each cavity layer 48 includes three rotor cavities 30 collectively shaped as an arc. As a non-limiting example, each cavity layer 48 may have a conic section shape, such as a semi-circular shape.

Relatively small permanent magnets 32 are placed near the rotor bridges 51 to saturate the magnetic leakage flux path, thereby increasing the reluctance torque of the synchronous reluctance motor 12 without increasing the spin loss in comparison to conventional motors. To this end, at least one of the permanent magnets 32 is disposed adjacent the rotor bridges 51. In the depicted embodiment, the entirety of each the permanent magnets 32 is closer to the outermost rotor surface 27 than to the innermost rotor surface 29 in order to maximize reluctance torque and power of the synchronous reluctance motor 12.

Each cavity layer 48 includes a first rotor cavity 30A, a second rotor cavity 30B, and a third rotor cavity 30C. Only one of the pair of first permanent magnets 32A is disposed in the first rotor cavity 30A, and only one of the pair of first permanent magnets 32A is disposed in a second rotor cavity 30B. Other than the first permanent magnet 32A, no matter in a solid state is disposed in the first rotor cavity 30A. Other the first permanent magnet 32A, no matter in a solid state is disposed in the second rotor cavity 30B. The term "matter is solid state" means matter that has a fixed volume and a fixed shape. The second rotor cavity 30B is completely empty. In other words, no matter in a solid state is disposed in the second rotor cavity 30B. A first intra-polar rib 34 separates the first rotor cavity 30A from the second rotor cavity 30B along the tangential direction indicated by arrow T. Moreover, the first intra-polar ribs 34 can be elongated along a first bridge axis B1 that is obliquely angled relative to the center pole axis 49 to enhance the structural integrity of the rotor 26. Multiple second intra-polar ribs 54 separate the second rotor cavity 30B from the third rotor cavity 30C along the tangential direction indicated by arrow T. Moreover, the second intra-polar ribs 54 can be elongated along a second bridge axis B2 that is obliquely angled relative to the center pole axis 49 to enhance the structural integrity of the rotor 26.

Figure 4:
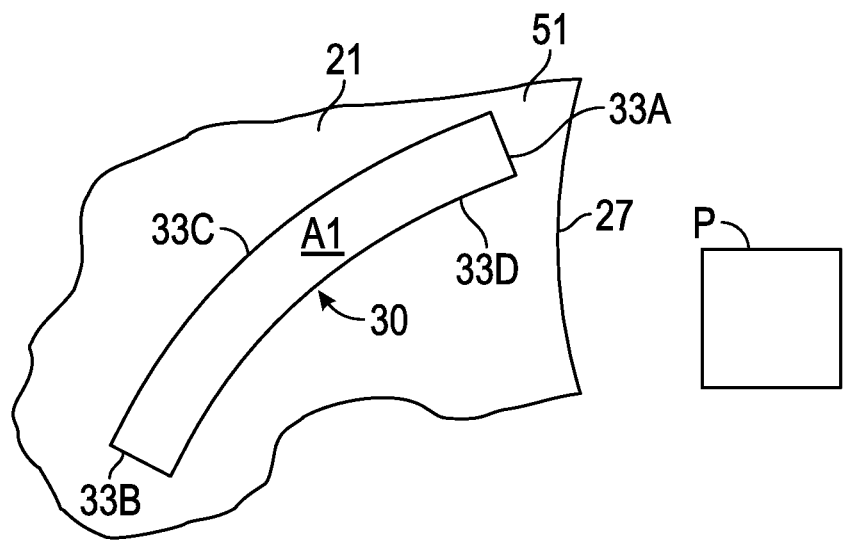
FIG. 4 is a schematic, fragmentary front view of the rotor, showing one of the rotor cavities, without the permanent magnet.

With reference to FIG. 4, each of the rotor cavities 30 has a cavity surface area A1 along the virtual plane P. The cavity surface area A1 of each rotor cavity 30 refers to the entire surface area of each rotor cavity 30 and is delimited only by a first rotor surface 33A, a second rotor surface 33B, a third rotor surface 33C, and a fourth rotor surface 33D of the rotor core 21. The first rotor surface 33A and the second rotor surface 33B are entirely linear and opposite to each other. The third rotor surface 33C and the fourth rotor surface 33D are curved and opposite to each other. The fourth rotor surface 33D is concave, whereas the third rotor surface 33C is convex. The entirety of each the permanent magnets 32 is closer to the first rotor surface 33A than to the second rotor surface 33A in order to maximize reluctance torque and power of the synchronous reluctance motor 12. The first rotor surface 33A is the surface defining the rotor cavity 30 that is closest to the bridge 51 and the outermost rotor surface 27.

Figure 5:
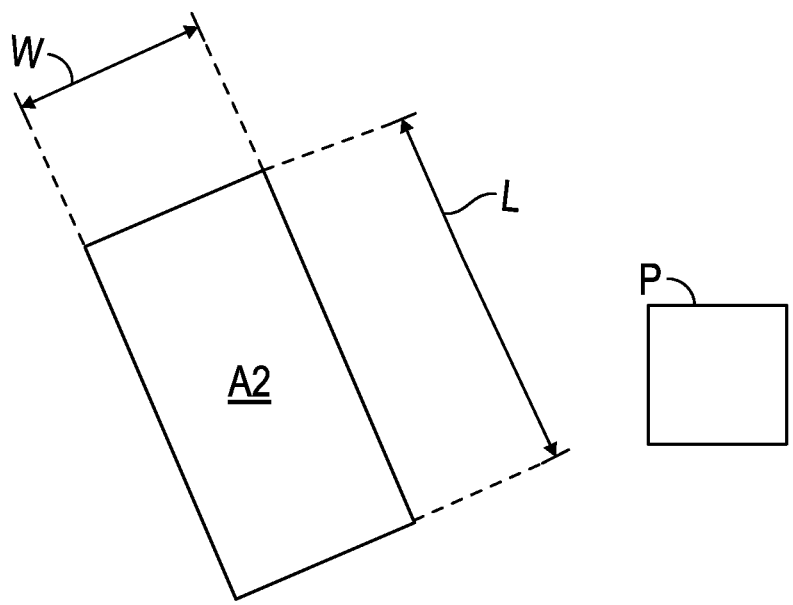
FIG. 5 is a schematic, front view of one of the permanent magnets.

With reference to FIG. 5, each permanent magnet 32 has a magnet surface area A2 along the virtual plane P. The permanent magnets 32 may have different surface areas. In the depicted embodiment, each of the permanent magnets 32 has a rectangular surface area. The magnet surface area A2 of each permanent magnet 32 refers to the entire surface area of each permanent magnet 32 and is only defined by a maximum magnet length L and a maximum magnet width W. The magnet surface area A2 of each permanent magnet 32 id equal to the maximum magnet length L multiplied by the a maximum magnet width W. For the permanent magnets 32 in the first cavity layer 48A, the maximum length L is about 1.73 millimeters (mm), and the maximum magnet width W is about 0.86 mm. For the permanent magnets 32 in the second cavity layer 48B, the maximum length L is about 1.08 mm, and the maximum magnet width W is about 1.2 mm. For the permanent magnets 32 in the third cavity layer 48C, the maximum length L is about 2.43 mm, and the maximum magnet width W is about 1.4 mm. For the permanent magnets 32 in the fourth cavity layer 48D, the maximum length L is about 2.5 mm, and the maximum magnet width W is about 1.35 mm. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. The dimensions described in this paragraph aid maximizing the reluctance torque of the synchronous reluctance motor 12. The rectangular shape of the surface area of the permanent magnets 32 also aids in maximizing the reluctance torque of the synchronous reluctance motor 12.

With reference to FIGS. 3-5, the cavity surface area A1 (defined along the virtual plane P) of each rotor cavity 30 is less than the magnet surface area A2 (defined along the same virtual plane P) of each permanent magnet 32. Specifically, the magnetic surface area A2 of one of the permanent magnets 32 is less than one tenth of the cavity surface area A1 of one of the rotor cavities 30 in order to maximize the reluctance torque of the synchronous reluctance motor 12 in comparison with conventional motors. Therefore, the permanent magnets 32 occupy less than fifty percent of the entire volume of the rotor cavities 30, thereby maximizing power and torque. Further, each of the permanent magnets 32 is adjacent to the outermost rotor surface 27 to maximize magnetic saturation at the first intra-polar ribs 34, the second intra-polar ribs 54, and the rotor bridges 51, thereby increasing the reluctance torque of the synchronous reluctance motor 12 without increasing the spin loss in comparison with conventional motors. Further, the magnetic surface area A2 of one of the permanent magnets 32 is greater than one fifteenth of the cavity surface area A1 of one of the rotor cavities 30 in order to maximize the reluctance torque of the synchronous reluctance motor 12 in comparison with conventional motors. In each of the rotor cavities 30, the permanent magnet 32 is closer to (and may be in direct contact with) first rotor surface 33A (which the rotor surface 33A of the rotor cavity 30 that is closest to the rotor bridge 51) than to the second rotor surface 33B in order to maximize the torque and power produced by the synchronous reluctance motor 12.

While the best modes for carrying out the teachings have been described in detail, those familiar with the art to which this disclosure relates will recognize various alternative designs and embodiments for practicing the teachings within the scope of the appended claims. The vehicle 10 and synchronous reluctance motor 12 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

What is claimed is:

1. A synchronous reluctance motor comprising:
   a stator including a plurality of electrical conductors; and
   a rotor concentrically disposed in relation to the stator, wherein the rotor is configured to rotate relative to the stator about a rotational axis, the rotor is spaced apart from the stator to define an air gap between the stator and the rotor, and the rotor includes:
      a rotor core defining an outermost rotor surface and an innermost rotor surface opposite the outermost rotor surface, wherein the rotor core includes a plurality of polar pieces arranged annularly about the rotational axis, at least one of the polar pieces defining a plurality of rotor cavities; and
      a plurality of permanent magnets each disposed in one of the rotor cavities, wherein each of the rotor cavities has a cavity surface area defined along a plane, wherein each of the permanent magnets has a magnet surface area defined along the plane, and the magnet surface area is less than one tenth of the cavity surface area.

2. The synchronous reluctance motor of claim 1, wherein the rotor core includes a plurality of rotor bridges separating the air gap and the rotor cavities, and each of the permanent magnets is adjacent to the outermost rotor surface to maximize magnetic saturation at the rotor bridges.

3. The synchronous reluctance motor of claim 2, wherein the rotor core includes a plurality of ribs separating the rotor cavities from each other, and each of the permanent magnets is closer to the rotor bridges than to the ribs.

4. The synchronous reluctance motor of claim 1, wherein the permanent magnets have different surface areas.

5. The synchronous reluctance motor of claim 1, wherein each of the permanent magnets has a rectangular surface area.

6. The synchronous reluctance motor of claim 1, wherein only the permanent magnets are disposed inside the rotor cavities.

7. The synchronous reluctance motor of claim 6, wherein the permanent magnets occupy less than fifty percent of an entire volume of the rotor cavities.

8. The synchronous reluctance motor of claim 1, wherein the rotor cavities are arranged in a plurality of cavity layers spaced apart from each other along a radial direction.

9. The synchronous reluctance motor of claim 8, wherein each of the plurality of rotor cavities includes a first rotor cavity, a second rotor cavity, and a third rotor cavity, one of the plurality of cavity layers is defined only by the first rotor cavity, the second rotor cavity, and the third rotor cavity, the first rotor cavity, the second rotor cavity, and the third rotor cavity collectively define a conic section shape.

10. The synchronous reluctance motor of claim 1, wherein the magnet surface area is greater than one fifteenth of the cavity surface area.

11. A vehicle comprising:
    a driveline; and
    a synchronous reluctance motor operatively connected to the driveline, the synchronous reluctance motor including:
       a stator including a plurality of electrical conductors; and
       a rotor concentrically disposed in relation to the stator, wherein the rotor is configured to rotate relative to the stator about a rotational axis, the rotor is spaced apart from the stator to define an air gap between the stator and the rotor, and the rotor includes:
          a rotor core defining an outermost rotor surface and an innermost rotor surface opposite the outermost rotor surface, wherein the rotor core includes a plurality of polar pieces arranged annularly about the rotational axis, and at least one of the polar pieces defines a plurality of rotor cavities; and
          a plurality of permanent magnets each disposed in one of the rotor cavities, wherein each of the rotor cavities has a cavity surface area defined along a plane, wherein each of the permanent magnets has a magnet surface area defined along the plane, and the magnet surface area is less than one tenth of the cavity surface area.

12. The vehicle of claim 11, wherein the rotor core includes a plurality of rotor bridges separating the air gap and the rotor cavities, and each of the permanent magnets is adjacent to the outermost rotor surface to maximize magnetic saturation at the rotor bridges.

13. The vehicle of claim 12, wherein the rotor core includes a plurality of ribs separating the rotor cavities from each other, and each of the permanent magnets is closer to the rotor bridges than to the ribs.

14. The vehicle of claim 11, wherein the permanent magnets have different surface areas.

15. The vehicle of claim 11, wherein each of the permanent magnets has a rectangular surface area.

16. The vehicle of claim 11, wherein only the permanent magnets are disposed inside the rotor cavities.

17. The vehicle of claim 16, wherein the permanent magnets occupy less than fifty percent of an entire volume of the rotor cavities.

18. The vehicle of claim 11, wherein the rotor cavities are arranged in a plurality of cavity layers spaced apart from each other along a radial direction.

19. The vehicle of claim 18, wherein the plurality of rotor cavities includes a first rotor cavity, a second rotor cavity, and a third rotor cavity, one of the plurality of cavity layers is defined only by the first rotor cavity, the second rotor cavity, and the third rotor cavity, the first rotor cavity, the second rotor cavity, and the third rotor cavity collectively define a conic section shape.

20. A vehicle, comprising:
a driveline; and
a synchronous reluctance motor operatively connected to the driveline, wherein the synchronous reluctance motor includes:
a stator including a plurality of electrical conductors; and
a rotor concentrically disposed in relation to the stator, wherein the rotor is configured to rotate relative to the stator about a rotational axis, the rotor is spaced apart from the stator to define an air gap between the stator and the rotor, and the rotor includes:
a rotor core defining an outermost rotor surface and an innermost rotor surface opposite the outermost rotor surface, wherein the rotor core includes a plurality of polar pieces arranged annularly about the rotational axis, and at least one of the polar pieces defines a plurality of rotor cavities, the rotor core includes a plurality of rotor bridges separating the air gap and the rotor cavities, the rotor core includes a plurality of ribs separating the rotor cavities from each other; and
a plurality of permanent magnets each disposed in one of the rotor cavities, wherein each of the permanent magnets is closer to the rotor bridges than to the ribs, and each of the permanent magnets is adjacent to the outermost rotor surface to maximize magnetic saturation at the rotor bridges, each of the rotor cavities has a cavity surface area defined along a plane, wherein each of the permanent magnets has a magnet surface area defined along the plane, each of the permanent magnets has a maximum magnet width and a maximum magnet length, the magnet surface area is equal to the maximum magnet width multiplied by the maximum magnet length, and the magnet surface area is less than one tenth of the cavity surface area, the magnet surface area is greater than one fifteenth of the cavity surface area, the magnet surface area has a rectangular shape, only the permanent magnets are disposed inside the rotor cavities, the permanent magnets occupy less than fifty percent of an entire volume of the rotor cavities, the rotor cavities are arranged in a plurality of cavity layers spaced apart from each other along a radial direction, the plurality of cavity layers include a first cavity layer, a second cavity layer, and a third cavity layer, each of the plurality of rotor cavities includes a first rotor cavity, a second rotor cavity, and a third rotor cavity, each of the plurality of cavity layers is defined only by the first rotor cavity, the second rotor cavity, and the third rotor cavity, the first rotor cavity, the second rotor cavity, and the third rotor cavity collectively define a conic section shape, a first intra-polar rib separates the separates the first rotor cavity from the second rotor cavity along a tangential direction, the tangential direction is perpendicular to the radial direction, a second intra-polar rib separates the second rotor cavity from the third rotor cavity along the tangential direction, each of the cavity layers includes only two permanent magnets, the maximum magnet length of each of the permanent magnets disposed in the first cavity layer is about 1.73 millimeters, the maximum magnet width of each of the permanent magnets disposed is the first cavity layer is about 0.86 millimeters, the maximum magnet length of each of the permanent magnets disposed in the first cavity layer is about 1.08 millimeters, the maximum magnet width of each of the permanent magnets disposed is the second cavity layer is about 1.2 millimeters, the maximum magnet length of each of the permanent magnets disposed in the third cavity layer is about 2.43 millimeters, and the maximum magnet width of each of the permanent magnets disposed is the second cavity layer is about 1.35 millimeters.

* * * * *